United States Patent [19]

Florio

[11] Patent Number: 4,950,202
[45] Date of Patent: Aug. 21, 1990

[54] TOY MAILBOX

[76] Inventor: Robert J. Florio, 8745 Merrimoor Blvd. E., Largo, Fla. 34647

[21] Appl. No.: 415,592

[22] Filed: Oct. 2, 1989

[51] Int. Cl.⁵ ................. A63H 33/22; A63H 33/00; F21V 7/04; B65D 91/00
[52] U.S. Cl. ................. 446/219; 446/491; 446/476; 362/32; 362/253; 232/17; 232/19; D21/109; D99/29
[58] Field of Search ............... 232/17, 19, 22; 362/32, 362/134, 253; D21/109, 114; D99/29, 30, 35, 36; 434/259; 446/219, 476, 477, 478, 479, 491, 901, 485

[56] References Cited

U.S. PATENT DOCUMENTS

| | | | |
|---|---|---|---|
| D. 240,061 | 5/1976 | Satten | D 21/109 |
| D. 256,287 | 8/1980 | McConnell | D 99/30 |
| D. 261,157 | 10/1981 | Wolf | D21/60 |
| D. 291,937 | 9/1987 | Fisher | D99/30 |
| 1,351,562 | 8/1920 | Foster | 362/32 |
| 2,501,160 | 3/1950 | Clarke | 362/32 X |
| 3,316,669 | 5/1967 | Nachbar | 446/901 X |
| 3,735,113 | 5/1973 | Stott | 362/32 |
| 3,766,376 | 10/1973 | Sadacca et al. | 362/32 X |
| 3,787,987 | 1/1974 | Brass | 446/491 X |
| 4,262,441 | 4/1981 | Wolf | 350/4.1 X |
| 4,270,721 | 6/1981 | Mainor, Jr. | 248/231.7 X |
| 4,359,185 | 11/1982 | Castro | 232/17 |
| 4,522,598 | 6/1985 | Cayne et al. | 434/259 |
| 4,648,012 | 3/1987 | Pitman II | 232/17 X |
| 4,696,652 | 9/1987 | Reeder et al. | 446/478 X |
| 4,729,751 | 3/1988 | Schiavo et al. | 446/901 X |
| 4,755,915 | 7/1988 | Rogers | D99/29 X |

Primary Examiner—Robert A. Hafer
Assistant Examiner—D. Neal Muir
Attorney, Agent, or Firm—Leon Gilden

[57] ABSTRACT

A toy mailbox includes a mounting member formed as an "L" shaped rod threadedly mounting the mailbox at an upper end and including a "C" shaped clamp for securing the mailbox to door frame portions of an interior door frame. The toy mailbox further includes a base with a battery housing and switch therein with fiber optic illumination members directed upwardly through a transparent post for selective illumination of the post as an alert when the mailbox is secured interiorly of a dwelling. A transparent base member is securable to the mailbox housing for securement to the post.

5 Claims, 5 Drawing Sheets

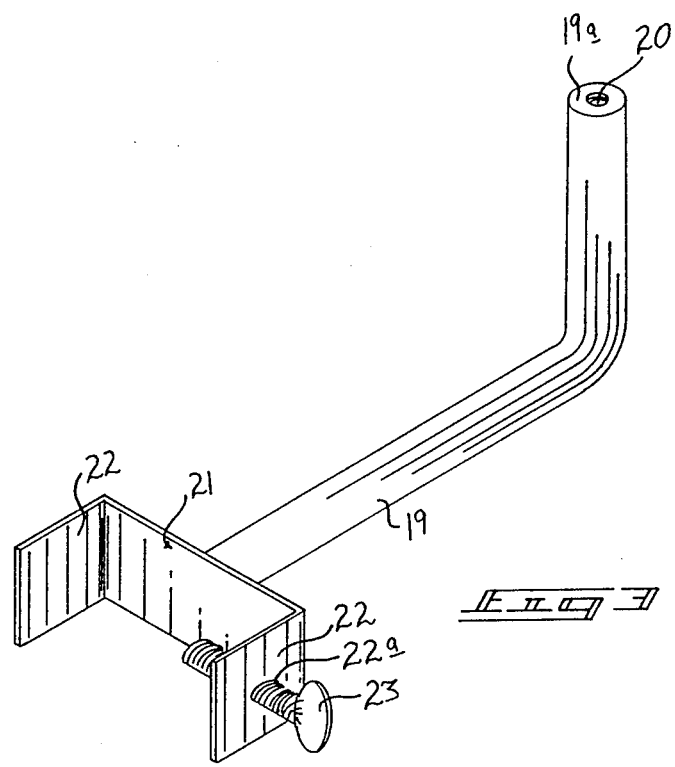
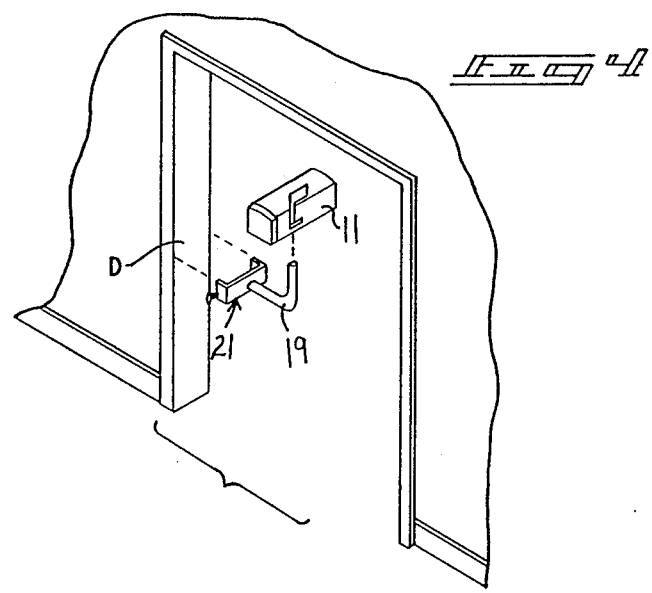

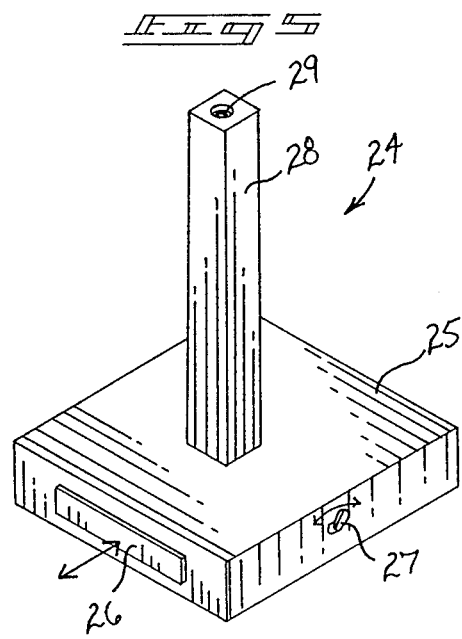
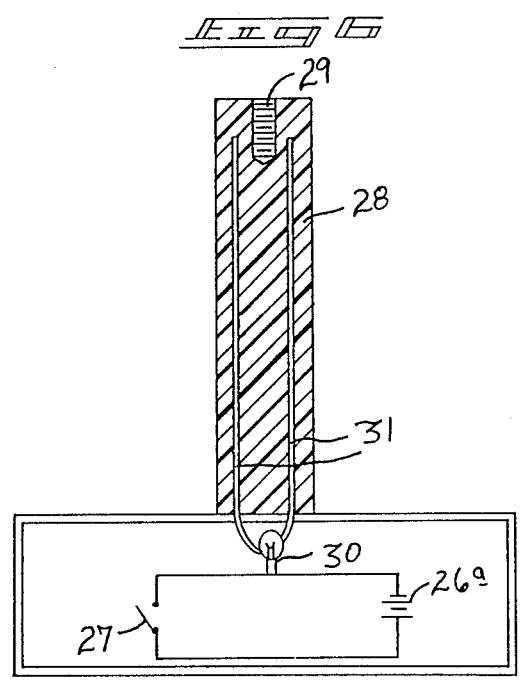

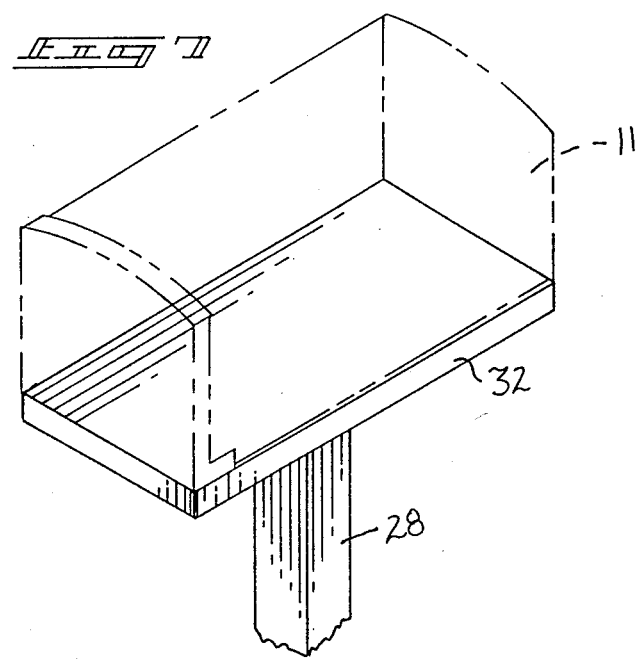
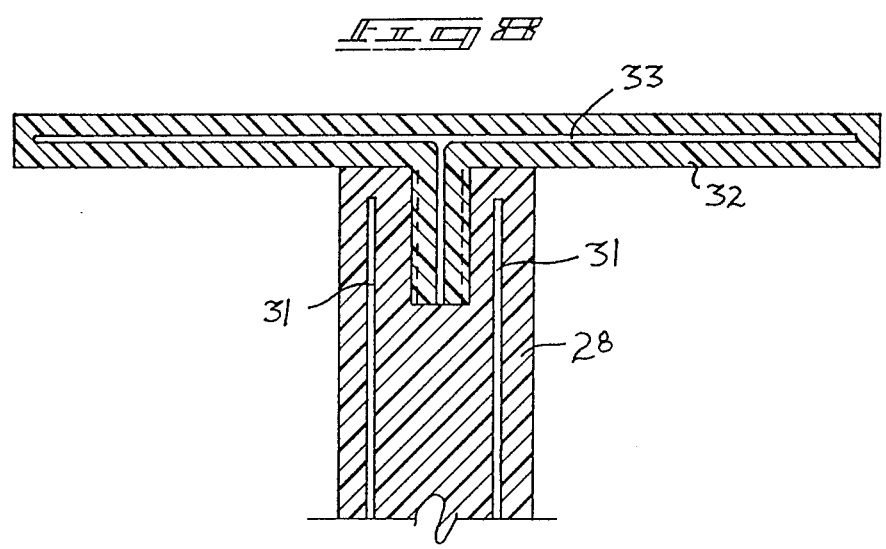

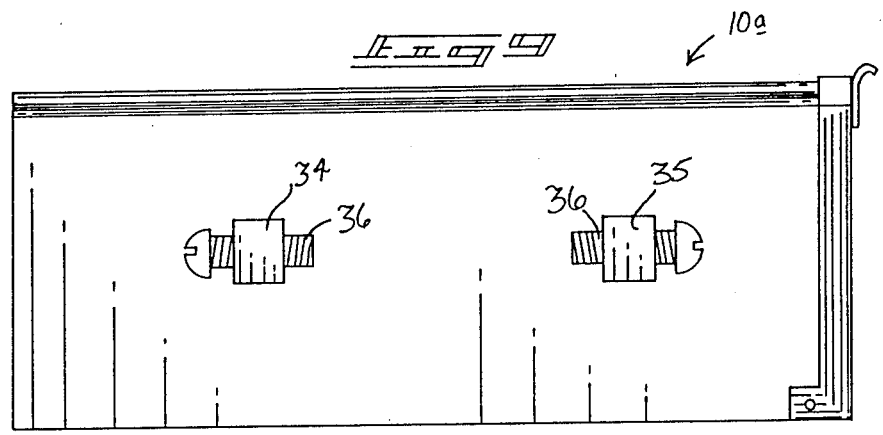
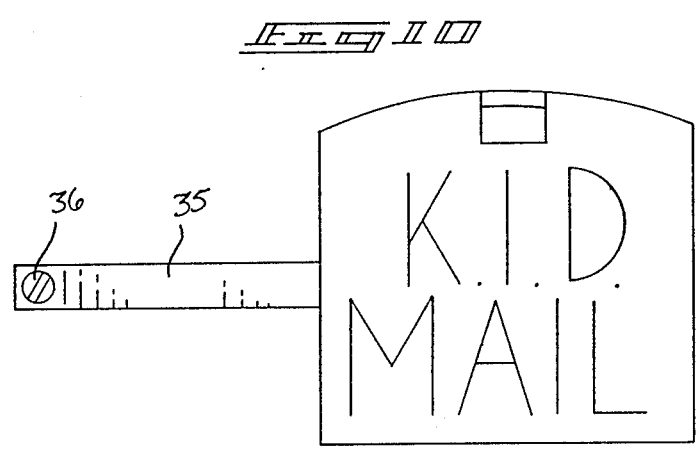

TOY MAILBOX

BACKGROUND OF THE INVENTION

1. Field of the Invention

The field of invention relates to toy apparatus, and more particularly pertains to a new and improved toy mailbox wherein the same provides enhanced securement and safety in use of the mailbox interiorly of a dwelling.

2. Description of the Prior Art

The use of toy apparatus of various types of the educational and amusement effect upon children is well known in the prior art. Toy mailboxes that have been utilized in the prior art by children have been randomly positioned throughout an interior portion of a dwelling and have been available to inadvertent contact and impact by individuals unaware of their position. The instant invention attempts to overcome the deficiencies of the prior art by providing a toy mailbox for the amusement and education of children utilizing a mailbox receptacle housing for receiving simulated correspondence and by providing multiple support structure for its random securement interiorly of a dwelling. Examples of the prior art in this area include U.S. Pat. No. 4,522,598 to Coyne, et al., wherein a toy mailbox is set forth as an educational toy utilizing various colors and key members to gain entrance interiorly of the mailbox.

U.S. Pat. No. 4,359,185 to Castro sets forth a mailbox formed and configured as a dwelling consistent with personal purposes of individuals.

U.S. Design Pat. No. 261,157 to Wolf; U.S. Design Pat. No. 291,937 to Fisher; and U.S. Design Pat. No. 256,287 to McConnell are each of interest in the prior art to illustrate mailboxes of various configurations.

As such, it may be appreciated that there is a continuing need for a new and improved toy mailbox which addresses both the problems of safety in use and effectiveness in construction, and in this respect, the present invention substantially fulfills this need.

SUMMARY OF THE INVENTION

In view of the foregoing disadvantages inherent in the known types of toy mailboxes now present in the prior art, the present invention provides a toy mailbox wherein the same includes simulated correspondence as well as support structure for selective securement interiorly of a dwelling, as well as modified support structure to enhance visibility of the device. As such, the general purpose of the present invention, which will be described subsequently in greater detail, is to provide a new and improved toy mailbox which has all the advantages of the prior art toy mailboxes and none of the disadvantages.

To attain this, the present invention includes a toy mailbox housing formed with a planar floor for receiving simulated correspondence therein, wherein the correspondence typically includes hook and loop fasteners to secure postage thereon for the education and enjoyment of individual children. An initial support stand includes an "L" shaped member with an internally threaded bore at its upper end of securedly receiving the toy mailbox. A "C" shaped clamp member at a lowermost end of the "L" shaped member is arranged for securement interior door frameworks within a dwelling. A modified support structure utilizes a base including a switch and battery compartment wherein the switch is operatively associated with an illumination device, wherein the illumination device, such as a bulb, is positioned adjacent fiber optic filaments directed parallel to one another within a transparent post for illumination of the post, and wherein optionally a transparent base is secured to the mailbox housing for securement to the post. A further clamping arrangement of the mailbox includes spaced parallel arms with threaded clamping members directed in an aligned opposed relationship relative to one another for effecting clamping of the mailbox to various support structures.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved toy mailbox which has all the advantages of the prior art toy mailboxes and none of the disadvantages.

It is another object of the present invention to provide a new and improved toy mailbox which may be easily and efficiently manufactured and marketed.

It is a further object of the present invention to provide a new and improved toy mailbox which is of a durable and reliable construction.

An even further object of the present invention is to provide a new and improved toy mailbox which is susceptible of a low cost of manufacture with regard to both materials and labor, and which accordingly is then susceptible of low prices of sale to the consuming public, thereby making such toy mailboxes economically available to the buying public.

Still yet another object of the present invention is to provide a new and improved toy mailbox which provides in the apparatuses and methods of the prior art some of the advantages thereof, while simultaneously overcoming some of the disadvantages normally associated therewith.

Still another object of the present invention is to provide a new and improved toy mailbox wherein the same utilizes simulated correspondence as well as various support structure for the education and amusement of children.

These, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of a first support structure utilized by the instant invention.

FIG. 4 is an isometric illustration of the first support structure of FIG. 3 secured to an interior doorway of a dwelling.

FIG. 5 is an isometric illustration of a further support structure utilized by the instant invention.

FIG. 6 is an orthographic cross-sectional view of the support structure as set forth in FIG. 5.

FIG. 7 is an isometric illustration of the transparent post of the support structure of FIGS. 5 and 6 secured to a transparent base.

FIG. 8 is an orthographic cross-sectional view of the support post and base as set forth in FIG. 7.

FIG. 9 is an orthographic side view taken in elevation of a modified mailbox housing utilized by the instant invention.

FIG. 10 is an orthographic frontal view taken in elevation of the modified mailbox housing, as illustrated in FIG. 9.

DESCRIPTION OF THE PREFERRED EMBODIMENT

Figure 1:
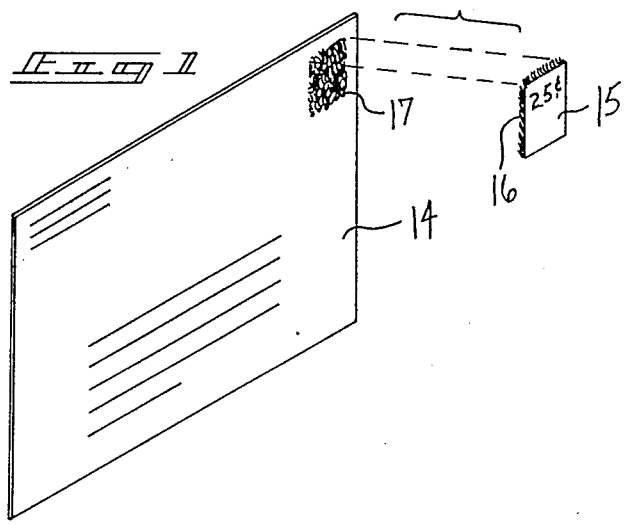
FIG. 1 is an isometric illustration of a simulated correspondence member as utilized by the instant invention.
Figure 2:
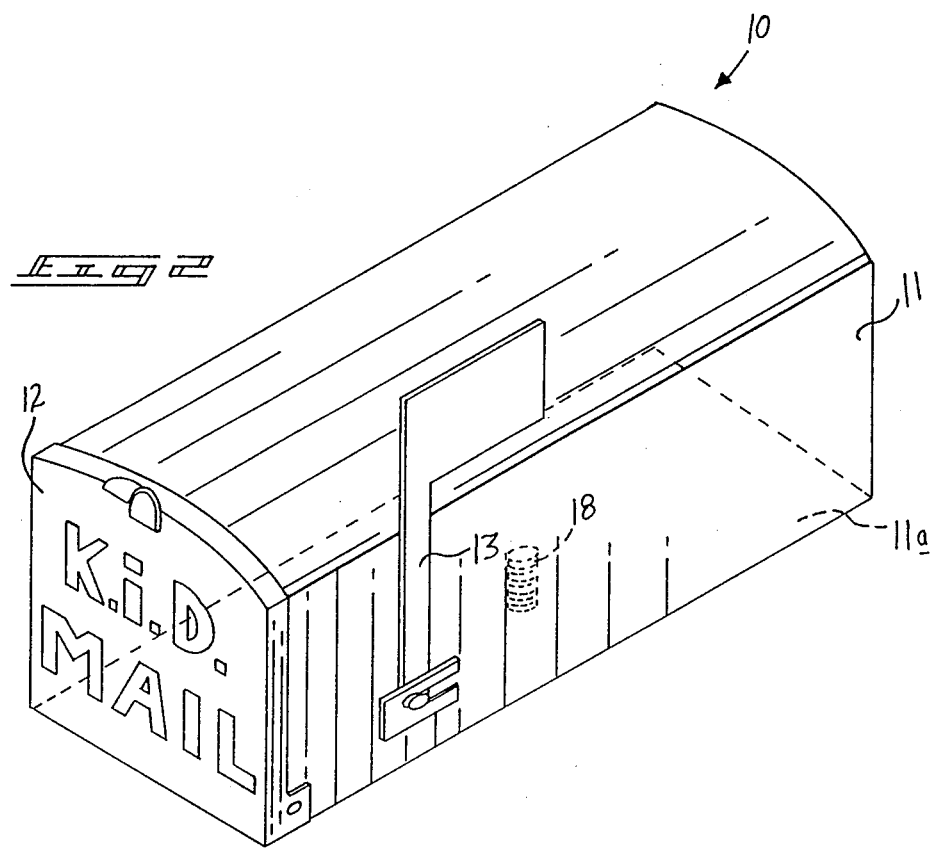
FIG. 2 is an isometric illustration of the mailbox housing utilized by the instant invention.

With reference now to the drawings, and in particular to FIGS. 1 to 10 thereof, a new and improved toy mailbox embodying the principles and concepts of the present invention and generally designated by the reference numeral 10 will be described.

More specifically, the toy mailbox 10 essentially comprises an elongate housing 11 including a planar floor 11a and upwardly extending rear and planar sides directed to an arcuate roof. A pivotally mounted door 12 is mounted at its lowermost end portion to the sides of the housing 11. A pivotally mounted flag member 13 is mounted to a side of the housing for simulation of mail received within the housing 11. Polymeric planar cards 14 simulating correspondence are included within the invention to enhance a child's imagination in use of the toy mailbox. The cards 14 include a simulated stamp member 15 of a generally rectangular configuration formed with a first hook and loop fastener surface 16 on a rearwardmost surface of the stamp 15 cooperative with a second hook and loop fastener surface 17 of a complementary configuration positioned on a right uppermost corner of the cards 14 to enable a child to simulate addressing envelopes prior to their delivery within the mailbox housing 11. A threaded boss member 18 extends downwardly and orthogonally relative to the planar floor 11a of the housing 11 and is securable to an upper end 19a of an "L" shaped rod 19 that includes internally threaded bore 20 directed through the upper end 19a to receive the threaded boss 18 therewithin. Threaded boss 18 is selectively securable within a complementary threaded bore formed within the planar floor 11a to enable selective securement to various support members, as will be discussed below. A lowermost end of the "L" shaped rod 19 includes a "C" shaped bracket 21 formed with parallel spaced legs 22. One of the legs 22 includes a threaded aperture 22a for receiving a threaded bolt member 23 therethrough. Accordingly, the threaded bolt member 23 may be directed interiorly of the parallel legs 22 for securement to a door frame "D", as illustrated in FIG. 4 for example.

FIG. 5 illustrates an illuminated support member 24 that includes a lower housing 25. The lower housing 25 includes a battery compartment 26 reciprocatably mounted therewithin for securement of batteries 26a diagrammatically illustrated in FIG. 6. The batteries are operably associated with a pivotally mounted switch 27 positioned on the lower housing 25 to selectively actuate an illumination bult 30. A transparent post 28 is orthogonally directed upwardly of the lower housing 25 and includes a plurality of fiber optic filaments 31 positioned parallel to one another within the post 28, wherein lowermost ends of the filaments 31 are in operative contiguous positioning in association with illumination bulb 30 to direct illumination from the bulb 30 through the fiber optic filaments 31 and accordingly illumination of the transparent post 28. The illumination of the transparent post 28 provides a signaling of positioning of the toy mailbox 10 throughout a dwelling to avoid inadvertent contact therewith and further enhance the imagination of a child in its use in the selective illumination of the post 28. It is noted that the uppermost end of the post 28 includes a threaded bore 29 for receiving the threaded boss of the mailbox therewithin. Alternatively, a transparent support base 32, as illustrated in FIGS. 7 and 8, may be utilized in cooperation with the housing 11, wherein the transparent boss 32 is provided with a central base cavity 33. The cavity 33 separates illumination from an underlying surface of the base 32 with an uppermost surface of the base 32 positioned on the opposed side of the cavity 33 to confine illumination to a lowermost of the base 32 and the surrounding peripheral side surfaces as the cavity 33 terminates short of the side surfaces of the base 32.

FIGS. 9 and 10 illustrate a modified toy mailbox housing 10a wherein first and second spaced parallel arms 34 and 35 are each provided with clamp members 36 threadedly mounted through remote ends of the arms 34 and 35, wherein the clamp members 36 position in coaxial alignment relative to one another to effect securement in the mailbox through a support member, such as a post and the like as desired.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A toy mailbox assembly comprising in combination,
   an elongate hollow housing including a planar floor and spaced side walls, and
   a pivotally mounted door pivotally mounted to the side walls of the housing, and
   a signal member pivotally mounted to one of said side walls, and
   polymeric card means for simulating correspondence selectively positionable interiorly of said housing, and
   support means for positioning said housing to a support surface, and
   wherein the card means is defined as a planar polymeric sheet and includes a rectangular stamp member selectively securable to the card means, the stamp member includes a first hook and loop fastener surface formed on a rear surface of the stamp member, and a second hook and loop fastener surface of a complementary shape to the first hook and loop fastener surface formed on an upper right hand corner of a forward face of the card means, wherein the first hook and loop fastener surface is selectively securable to the second hook and loop fastener surface, and
   wherein a threaded boss is selectively securable to the planar floor of the housing and is directed orthogonally downwardly from the planar floor, and the support means includes an "L" shaped member formed with a threaded bore in an upper end of the "L" shaped member and a "C" shaped bracket secured orthogonally to a lower end of the "L" shaped member, the "L" shaped bracket includes spaced parallel arms with a threaded aperture formed through one of said arms orthogonally aligned through one of said arms with a threaded bolt member orthogonally aligned through said threaded aperture and reciprocatable therethrough for clamping of the "L" shaped member to a support post, and
   wherein the support means includes an illuminated support member, the illuminated support member includes a lower housing with a transparent post orthogonally and integrally mounted to an upper surface of the lower housing, and the lower housing includes illumination means for selectively illuminating the transparent post.

2. A toy mailbox assembly as set forth in claim 1 wherein the illumination means includes a selectively actuated bulb mounted within said lower housing, the transparent bulb positioned adjacent a plurality of fiber optic filaments, the fiber optic filaments positioned parallel relative to one another within the transparent post.

3. A toy mailbox assembly as set forth in claim 2 further including a transparent base selectively securable to the transparent post, the transparent base including a central cavity to confine illumination of the transparent base to a bottom surface of the transparent base and side surfaces of the transparent base.

4. A toy mailbox assembly as set forth in claim 3 wherein the elongate housing is positionable upon an upper surface of the transparent base.

5. A toy mailbox assembly as set forth in claim 1 wherein an opposed side wall of said housing includes a plurality of parallel rigid arms orthogonally mounted to the housing, the arms including a threaded clamp member reciprocatably mounted through each end of the arm, each threaded clamp member coaxially aligned relative to one another.

* * * * *